UNITED STATES PATENT OFFICE.

GEORGE A. HOFFMANN, JR., OF MONONGAHELA CITY, PENNSYLVANIA.

COMPOSITION FOR FIRE-BRICK.

SPECIFICATION forming part of Letters Patent No. 276,041, dated April 17, 1883.

Application filed January 18, 1883. (No specimens.)

To all whom it may concern:

Be it known that I, GEORGE A. HOFFMANN, Jr., a citizen of the United States of America, residing at Monongahela City, in the county of Washington and State of Pennsylvania, have invented certain new and useful Improvements in Compositions for Fire-Brick; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in a refractory material which may be utilized for fire-brick, chimney-caps, and analogous purposes; and it consists in the employment of a material termed "overslate," which is found above the strata of bituminous coal.

It also consists in combining with the said overslate other ingredients, as will be hereinafter more fully set forth.

Heretofore the overslate has been useless and a sort of nuisance to both miners and mine operators, and I propose to utilize the same, so as to give it commercial value. In utilizing this overslate for the manfacture of fire-brick, to about thirty pounds (avordupois) of the same, two-thirds is reduced to about the consistency of ordinary building-sand and the balance to the consistency of flour. To the above amount of material I add about thirty-two ounces (avordupois) of fire-sand. To the above-named thirty-two pounds of material I add four ounces of protoxide of calcium or lime, which is first reduced to a liquid state by the addition of eight ounces of water. To the above amount of granulated slate, fire-sand, lime, and water I add eight ounces of sawdust. The above materials or substances are thoroughly incorporated with each other by mixing in any well-known manner, and a small quantity of water is added to reduce the same. The material is then ready to be molded into the required shape. After being molded they are treated or baked after the manner of ordinary bricks.

The protoxide of calcium or lime is introduced into my composition for three purposes, to wit: The natural color of the overslate, being of a dark leaden hue, is changed by the addition of this lime, when the material is baked, from the tint hereinbefore named to a cream-white, and for the purpose of causing the pulverized materials to adhere. It also makes the bricks of a porous character, enabling the same to expand and contract sufficiently without fracturing the same when subjected to the influences of heat and cold. It does not injure the fire-resisting qualities of the slate.

The sawdust is introduced for the purpose of giving the bricks a porous character, enabling the same to expand and contract, the sawdust being consumed when the bricks are baked, and the spaces thus left bring about this result.

The fire-sand hereinbefore mentioned is introduced to give the bricks additional fire-resisting qualities. If desirable, instead of lime, I can employ chalk, plaster-of-paris, or calcined gypsum, or other equivalent material. If desirable, the fire-sand may be entirely dispensed with.

By the combination of the hereinbefore-described ingredients I have succeeded in making a material which is highly refractory, cheap, and readily manufactured.

I am aware that prior to my invention what has been termed "slate-clay" has been employed in the manufacture of artificial stone, and I do not claim such, what I term "overslate" in the foregoing specification being of an entirely different substance, possessing qualities different from those found in what is termed "slate-clay."

Having thus described my invention, what I claim as new, and desire to secure by Letters Patent, is—

1. An artificial stone having highly-refractory qualities, consisting of overslate, lime, sand, sawdust, and water, incorporated with each other and baked, substantially as described.

2. As an element in the manufacture of materials such as fire-bricks, sawdust incorporated with other ingredients and heated so as to destroy the sawdust, in order to render the material porous, substantially as described.

In testimony whereof I affix my signature in presence of two witnesses.

GEORGE A. HOFFMANN, JR.

Witnesses:
J. A. STOCKDALE,
P. DEWAR.